United States Patent
Andrews

[15] 3,659,886
[45] May 2, 1972

[54] AIRCRAFT PANELS WITH PRECISELY ADJUSTABLE AND EASY ACTION SPRING TOGGLE LATCH

[72] Inventor: Weldon R. Andrews, Seattle, Wash.
[73] Assignee: Sealth Aero Marine Company, Seattle, Wash.
[22] Filed: May 1, 1970
[21] Appl. No.: 33,958

[52] U.S. Cl. .................................. 292/78, 292/DIG. 49
[51] Int. Cl. ........................................................ E05c 19/02
[58] Field of Search .............. 292/113, 78, 79 TC, 216, 198; 244/118, 131

[56] References Cited

UNITED STATES PATENTS

| | | | |
|---|---|---|---|
| 2,355,895 | 8/1944 | Roberts | 292/78 |
| 3,197,247 | 7/1965 | Russell | 292/163 |
| 927,240 | 7/1909 | Hoffman | 292/78 |
| 2,927,812 | 3/1960 | Smith et al | 292/196 |

FOREIGN PATENTS OR APPLICATIONS

| | | | |
|---|---|---|---|
| 1,013,656 | 4/1952 | France | 292/78 |

Primary Examiner—Richard E. Moore
Attorney—Theron H. Nichols

[57] ABSTRACT

An aircraft interior panel, either removable or pivotally mounted in aircraft fixed structure having a new spring toggle latch comprising (1) accurate and precise spring tension, shim adjusting means for varying the compression of the spring for varying the supporting capabilities or forces of the panel latch so that a slightly increased downward, outward, or upward force releases the panel allowing it to swing out for accessibility thereto and (2) a spherical bearing means on the end of a toggle arm of the spring latch for ensuring a reliable, constant resistance, and an easy action in both locking and unlocking of the spring toggle latch.

2 Claims, 5 Drawing Figures

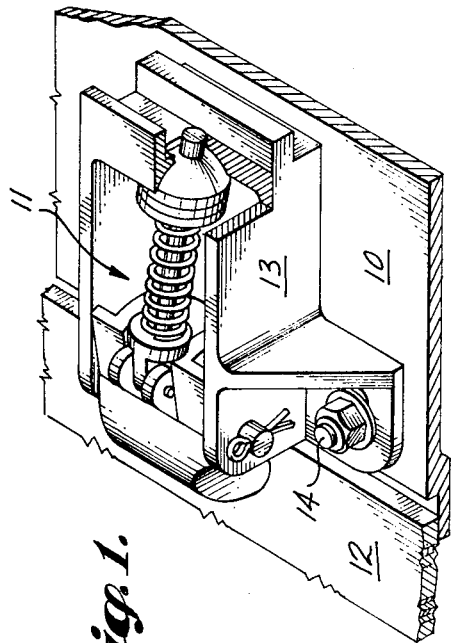
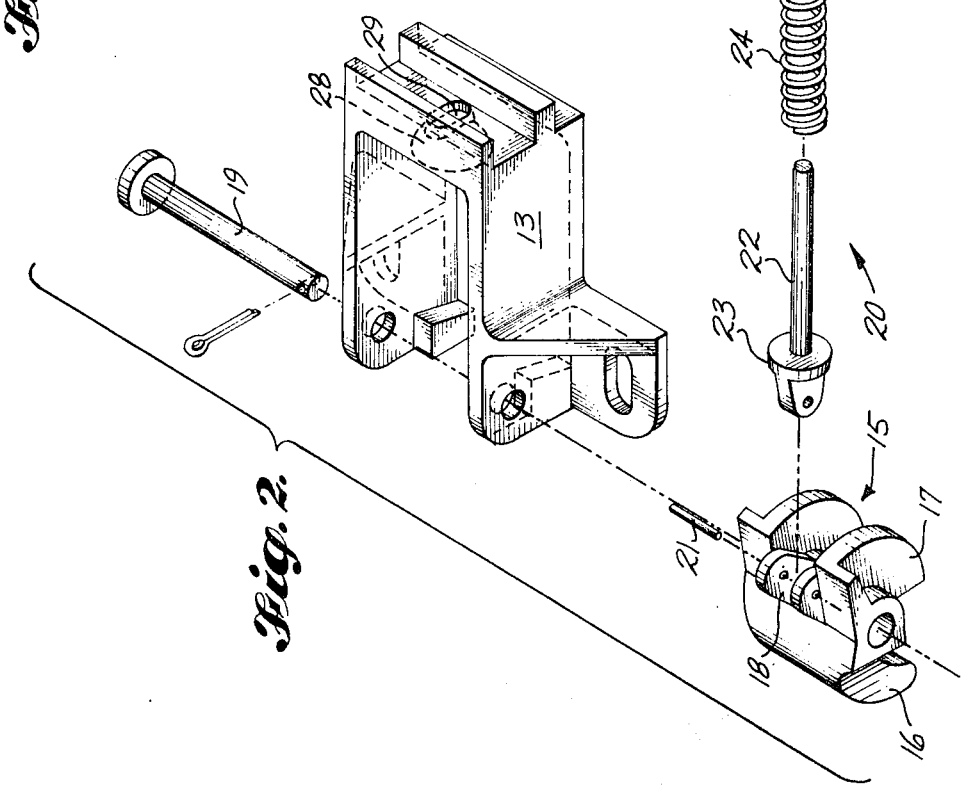

INVENTOR.
WELDON R. ANDREWS
BY
Theron H. Nichols
AGENT

AIRCRAFT PANELS WITH PRECISELY ADJUSTABLE AND EASY ACTION SPRING TOGGLE LATCH

SUMMARY OF THE INVENTION

This invention pertains to a pivotally mounted aircraft panel with a new, precisely adjustable, and easy action spring toggle latch.

More particularly, this panel has combined therewith a new toggle latch having (1) an accurate and precise spring tension adjusting stack of shims on one of two legs of the toggle latch and in juxtaposition with a spring on one of the legs for varying the compression of the spring for varying the supporting capabilities of forces of the panel spring latch so that only a slightly increased outward force on the panel at the catch releases the panel to permit it to swing out or down for accessibility therein, and (2) a spherical bearing means on the end of the toggle spring arm at its connection with the panel for ensuring a reliable, constant resistance, and easy action in both locking and unlocking of the spring toggle latch.

Thus, the new spring toggle latch forms a highly efficient latch for incorporation with a panel, particularly one for aircraft passenger carry-on luggage in an aircraft passenger air liner or transport.

Accordingly, a principal object of this invention is to provide in combination with a panel a spring toggle latch that has reliably accurate and precise spring tension means for varying the compression of the spring for varying the supporting capabilities of the pivotally mounted panel latch so that only a slightly increased downward or outward force will release the latch for allowing the panel to swing down or out for accessibility thereto.

Another principal object of this invention is to provide a spring toggle latch having a spherical bearing between a toggle arm and the structure it is connected to for ensuring a reliable, constant resistance, and easy action in both locking and unlocking of the spring toggle latch.

Other objects and various advantages of the disclosed panel spring toggle latch will be apparent from the following detailed description, together with the accompanying drawings, submitted for purposes of illustration only.

BRIEF DESCRIPTION OF THE FIGURES

The drawings diagrammatically illustrate by way of example, not by way of limitation, one form of the invention wherein like reference numerals designate corresponding parts in the several views in which:

FIG. 1 illustrates the portion of the aircraft storage panel with its locking and unlocking spring toggle latch in locked and supporting position;

FIG. 2 is an exploded view of the spring toggle latch of FIG. 1;

DESCRIPTION OF THE PREFERRED EMBODIMENT

Figure 3:
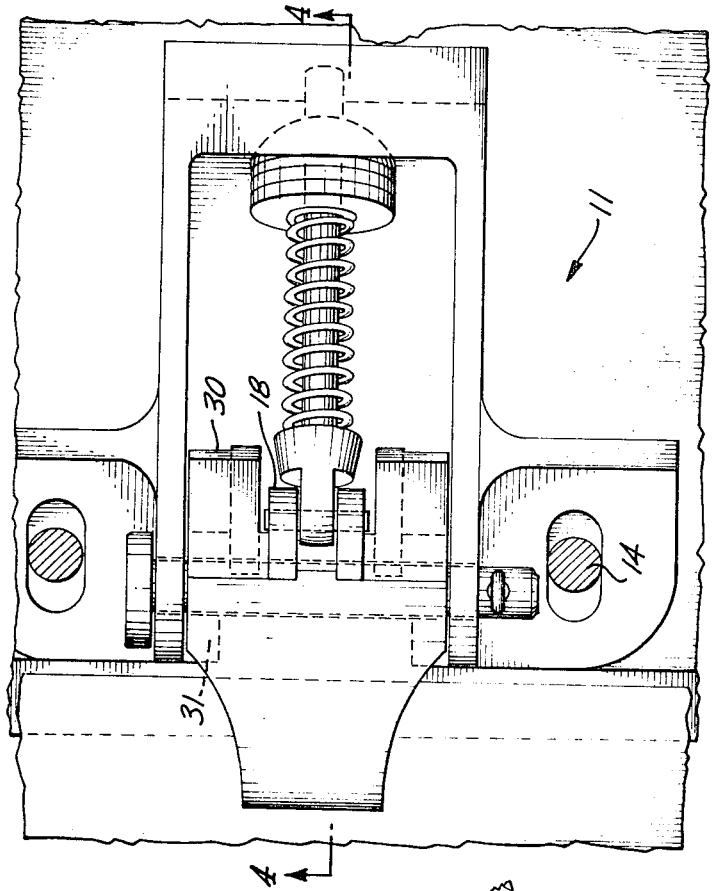
FIG. 3 is a top view of the spring toggle latch and panel of FIG. 1.

The invention, the scope of which being defined in the appended claims, is not limited in its application to the details of construction and arrangement of parts shown and described, since the invention is capable of other embodiments and of being practiced or carried out in various other ways. Also it is to be understood that the phraseology or terminology employed herein is for the purpose of description and not of limitation.

FIG. 1 illustrates a portion of a wall panel of the aircraft panel 10, such as, but not limited to a removable ceiling or wall panel having the new locking and unlocking spring toggle latch 11 for supporting one edge of the panel to an edge or ledge 12 of another wall panel in an aircraft cabin ceiling or side wall.

While the removable panel 10 may be any swingable structure, such as but not limited to a storage bin, the preferred use is as an aircraft removable ceiling or wall panel.

FIG. 2, an exploded view of the spring toggle latch 11, shows the essential parts of the spring toggle latch 11 of the invention. Toggle latch housing 13, while shown as being a separate part, may be integral to the panel 10 if so desired. Bolts, or the like, 14, FIG. 1, secure the housing 13 to the panel 10 at the edge thereof adjacent the recess panel edge 12. Yoke 15, FIG. 1, has a hook shaped arm 16 for supporting all the weight of one edge of the panel, as shown in panel supporting position in FIGS. 1, 3, and 4, and a locking arm 17, FIG. 1, for contacting the edge 12, FIG. 5, as the panel is raised toward locked position in the direction of the down arrow, FIG. 5, to fully locked up position of FIGS. 1 and 4. Yoke 15, FIG. 2, having a neck 18 is pivoted about pin 19 on the housing 13. Yoke 15 forms one arm of the toggle, and a second arm 20 pivotally connected thereto with pin 21 completes the toggle.

Toggle second arm 20, FIG. 2, comprises an elongated, headed rod 22 with the head 23 pivotally connected to the other arm or yoke 15 with the pin 21, a spring 24 circumscribing or coiled around the rod 22 and compressed between the head 23 and a stack of shims 25 on the rod 22, and a hemispherical bearing 26 on the rod adjacent the shims with the flat side next to the shims and the spherical bearing surface 27 on the opposite side pressed in juxtapositional contact with a second complementary or identical spherical bearing surface 28 around orifice 29 in the back of housing 13 with the end of the rod 22 protruding through all elements as shown in FIGS. 1 and 3–5.

The stack of shims 25 illustrated on all FIGS. forms an adjustable spring tension means. With the shims varying in thickness from 0.0005 inches to 0.050 inches each, one or more shims may be added or deleted in order to set the exact compression of spring 24 to provide the exactly desired releasing force required to unlatch the spring toggle latch 11 and accordingly the exactly desired force to pull down on panel 10 to release it for ingress and egress from behind the panel, for the example disclosed and as explained hereinafter.

The hemispherical bearin 26 and the housing spherical bearing surface 28 form a spherical bearing means in the panel for ensuring that the panel is reliable, produces constant resistance when combined with the adjustable spring tension means, and is easy acting for both locking and unlocking of the panel in raised and lowered positions, respectively.

FIG. 3 illustrates a top view of the combination toggle latch and panel in locked and latch supporting position.

Figure 4:
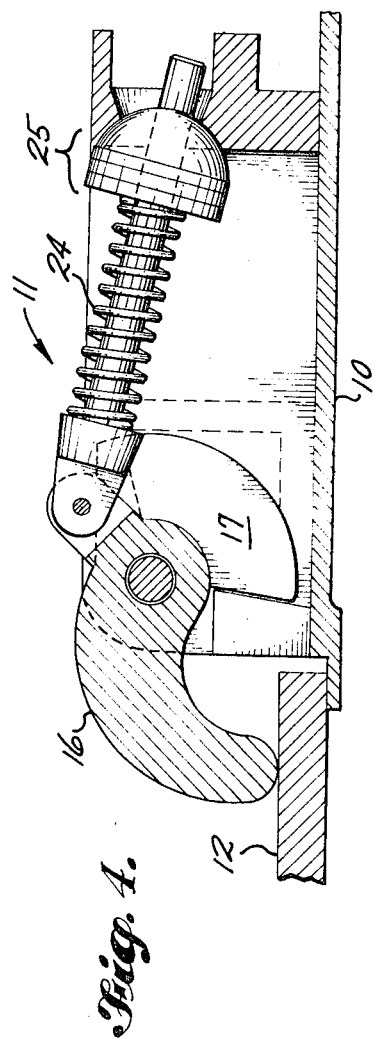
FIG. 4 is a sectional view taken at 4—4 on FIG. 3 illustrating the toggle latch in locked and supporting position.

FIG. 4, a sectional view taken at 4—4 on FIG. 3, illustrates how one edge of the panel 10 is supported on aircraft cabin recess edge 12 with spring toggle latch 11. While FIG. 4 of the drawing is an enlarged cutaway illustration of the actual latch 11, the three shims illustrated, from left to right, represent 0.020, 0.020, and 0.017 inch thickness shims, respectively. Obviously other shims are interchangeable therewith to provide the desired and proper compression in spring 24 for supporting panel 10 on the locked edge 12 of the recess in which the bin occupies while in locked position so that only a slight downward pull is required from a handle (not shown) on the bin to rotate supporting arm 16 of the yoke clockwise about pivot pin 19 to the unlocked position of FIG. 5.

Figure 5:
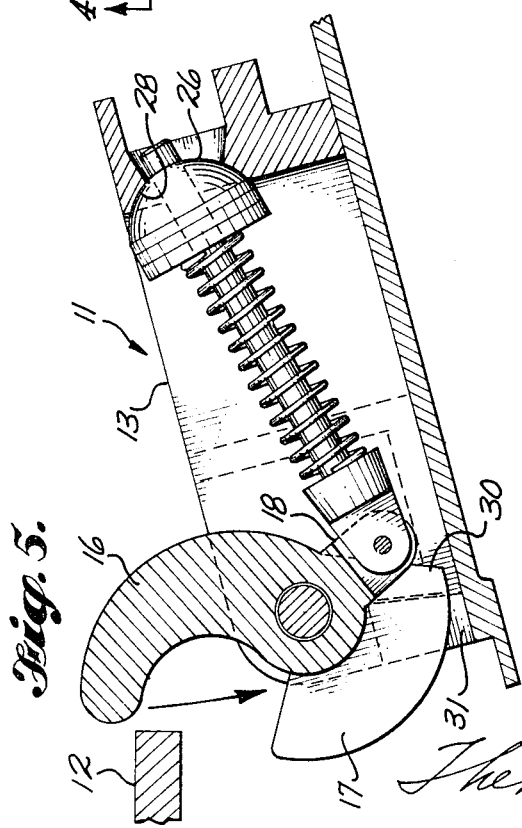
FIG. 5 is a sectional view similar to FIG. 4, but with the panel having just been pulled downward or outward to unlock the toggle latch or just having been raised just prior to the toggle latch being locked in up position.

FIG. 5 illustrates the spring toggle latch being spring urged to unlocked position and prevented from further rotation because protuberances 30 on locking arm 17 of the yoke contact a protuberance 31 on the housing 13 on each side of the double neck 18, particularly as shown in FIG. 3, for access to the panel. Likewise, with upward swinging movement of the panel, locking arm 17 contacts edge 12 to rotate the hook shaped arm 16 into locking contact with the edge 12 for securing the panel.

FIG. 5 further illustrates how the spherical surface 27 of bearing 26 oscillates with constant yet little friction against the housing bearing surface 28. When the housing 13 is integral with the panel 10, bearing surface 28 is then in the panel. In any event, with the bearing friction and the weight of the panel being substantially inexorably constant, only one variable remains, the maximum weight of a panel, for use in setting the spring compression. Records of thousands, if not millions of panel weights are available to the airlines for determining the average weight to a very accurate value.

Accordingly, an aircraft panel is disclosed in combination with a spring toggle latch which has accurate and precise spring tension and shim adjusting means for varying the compression of the spring for varying the supporting capabilities or forces of the panel latch so that only a slightly increased downward force is required to release the panel to permit it to swing down for accessibility therebehind. Also, a spherical bearing means on the end of the toggle arm of the spring toggle latch is disclosed for ensuring a reliable, constant friction, and an easy action in both locking and unlocking of the spring toggle latch.

While only one embodiment of the invention has been shown in the accompanying specification and drawings, it will be evident that various other modifications are possible in the arrangement and construction of the disclosed aircraft panel with precisely adjustable and easy action spring toggle latch without departing from the scope of the invention, and it is accordingly desired to comprehend within the purview of this invention such modifications as may be considered to fall within the scope of the appended claims.

I claim:

1. In a spring toggle latch having two pivotally interconnected toggle arms, one arm being pivotally connected to the swingable structure and comprising a yoke for locking an unlocking the swingable structure to a ledge on the fixed structure and the other toggle arm having an end protruding into an orifice in the swingable structure and having a spring retained on and circumscribing the other arm for urging the yoke into either the locked or unlocked position, the new combination comprising, a. said swingable structure having a spherical surface circumscribing said orifice,
b. a bearing on said other arm having a complementary spherical surface in juxtaposition with said spherical surface circumscribing said orifice, and
c. shims on said other arm compressed between said spring and said bearing whereby said shims are removable to vary the strength of the spring for supporting various weights of said swingable structure on said yoke of said latch, all combined for forming a reliable easy action, long life, and precision, quickly adjustable spring toggle latch.

2. In a spring toggle latch having two pivotally interconnected toggle arms operatively mounted on a swingable panel, the swingable panel being pivoted at one end to an aircraft cabin fixed structure and the other end of the swingable panel being supported solely by the spring toggle latch whereby a slight downward pull in addition to the weight of the swingable structure releases or unlocks said latch, one of said spring toggle arms being pivotally connected to the swingable panel and comprising a yoke for locking and unlocking the swingable panel to a ledge on the aircraft cabin fixed structure and the other toggle arm having an end protruding into an orifice means on the swingable panel and having a spring retained on and circumscribing said other arm for urging the yoke into either the locked or unlocked position, the new combination comprising, a. said swingable panel having a spherical surface circumscribing said orifice,
b. a bearing on said other arm having a complementary spherical surface in juxtaposition with said spherical surface circumscribing said orifice, and
c. shims on said other arm compressed between said spring and said bearing whereby said shims are removable to vary the strength of the spring for supporting various weights of said swingable panel on said yoke of said latch, all combined for forming an easy action, constant resistance long life, reliable, and precisely and quickly adjustable spring toggle latch and aircraft panel.

* * * * *